(12) United States Patent
Maeda et al.

(10) Patent No.: US 8,128,741 B2
(45) Date of Patent: Mar. 6, 2012

(54) GAS DISSOLVING APPARATUS

(75) Inventors: Yasunari Maeda, Ibaraki (JP);
Shigeyuki Yamaguchi, Daitou (JP);
Kazumasa Rokushima, Nishinomiya (JP); Naoki Shibata, Hirakata (JP);
Hitoshi Kitamura, Kyotanabe (JP);
Noriyuki Kitachi, Neyagawa (JP);
Yoshihiro Itou, Otsu (JP); Takaya Niu, Moriguchi (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 595 days.

(21) Appl. No.: 12/300,678

(22) PCT Filed: May 28, 2007

(86) PCT No.: PCT/JP2007/061234
§ 371 (c)(1),
(2), (4) Date: Nov. 13, 2008

(87) PCT Pub. No.: WO2007/142164
PCT Pub. Date: Dec. 13, 2007

(65) Prior Publication Data
US 2009/0230573 A1   Sep. 17, 2009

(30) Foreign Application Priority Data

May 26, 2006   (JP) .................................. 2006-147396
May 26, 2006   (JP) .................................. 2006-147397

(51) Int. Cl.
*B01D 19/00*   (2006.01)

(52) U.S. Cl. ........... 96/206; 96/220; 210/150; 261/79.2; 261/119.1

(58) Field of Classification Search ................... 216/77, 216/79.2, 115, 118, 119.1, DIG. 75; 96/206, 96/220; 210/150, 151
See application file for complete search history.

(56) References Cited

U.S. PATENT DOCUMENTS
1,732,583 A * 10/1929 Lehnen ........................ 261/29
(Continued)

FOREIGN PATENT DOCUMENTS
DE    2602181    7/1976
(Continued)

OTHER PUBLICATIONS

English language Abstract of JP 2004-290803, Oct. 21, 2004.
(Continued)

*Primary Examiner* — Richard L Chiesa
(74) *Attorney, Agent, or Firm* — Greenblum & Bernstein, P.L.C.

(57) ABSTRACT

A dissolving apparatus has a cylindrical tubular container closed at both ends with its center axis being inclined to the horizon. A center of an interface between a gas and a liquid in the container is positioned at a center in a lengthwise direction of a side wall of the container. Two inner spaces of the container above and below the interface are referred to as a gas section and a liquid section. An injection inlet for injecting a gas-liquid mixed fluid into the container is provided at a level corresponding to, or lower than, the interface. A liquid outlet for discharging the liquid is provided near a bottom of the liquid section of the container. Since the container is inclined, the interface can have an area large enough to promote dissolution of the gas into the liquid. Since the depth of the liquid in the liquid section is sufficiently deep, the liquid can be prevented from being discharged through the liquid outlet with large gas bubbles being present therein.

11 Claims, 13 Drawing Sheets

U.S. PATENT DOCUMENTS

| | | | |
|---|---|---|---|
| 2,854,002 A | | 9/1958 | De Wall et al. |
| 3,238,021 A | * | 3/1966 | Webber et al. ............... 422/224 |
| 3,732,668 A | * | 5/1973 | Nichols ........................ 96/174 |
| 3,938,738 A | * | 2/1976 | Nagel et al. .................... 239/9 |
| 3,967,941 A | * | 7/1976 | Terao ............................. 96/318 |
| 4,215,081 A | * | 7/1980 | Brooks ....................... 261/122.1 |
| 5,507,858 A | * | 4/1996 | Jepson ........................... 95/262 |
| 5,705,132 A | * | 1/1998 | Maupin et al. ............... 422/198 |
| 5,741,443 A | * | 4/1998 | Gemza ........................... 261/77 |
| 5,770,068 A | * | 6/1998 | Jepson ......................... 210/741 |
| 5,951,867 A | | 9/1999 | Blough et al. |
| 6,142,456 A | | 11/2000 | Machiya et al. |
| 6,162,359 A | * | 12/2000 | Andre et al. ................. 210/604 |
| 6,254,667 B1 | * | 7/2001 | Saito et al. ..................... 95/254 |
| 6,315,273 B1 | | 11/2001 | Davies |
| 2003/0102580 A1 | * | 6/2003 | Khudenko ..................... 261/77 |

FOREIGN PATENT DOCUMENTS

| | | |
|---|---|---|
| GB | 1476883 | 6/1977 |
| JP | 9-173804 | 7/1997 |
| JP | 10-244138 | 9/1998 |
| JP | 2002-239537 | 8/2002 |
| JP | 2004-290803 | 10/2004 |
| JP | 2004-313847 | 11/2004 |
| JP | 2005-329100 | 12/2005 |

OTHER PUBLICATIONS

Japan Office action, dated May 24, 2011 along with an english translation thereof.

* cited by examiner

F IG .8
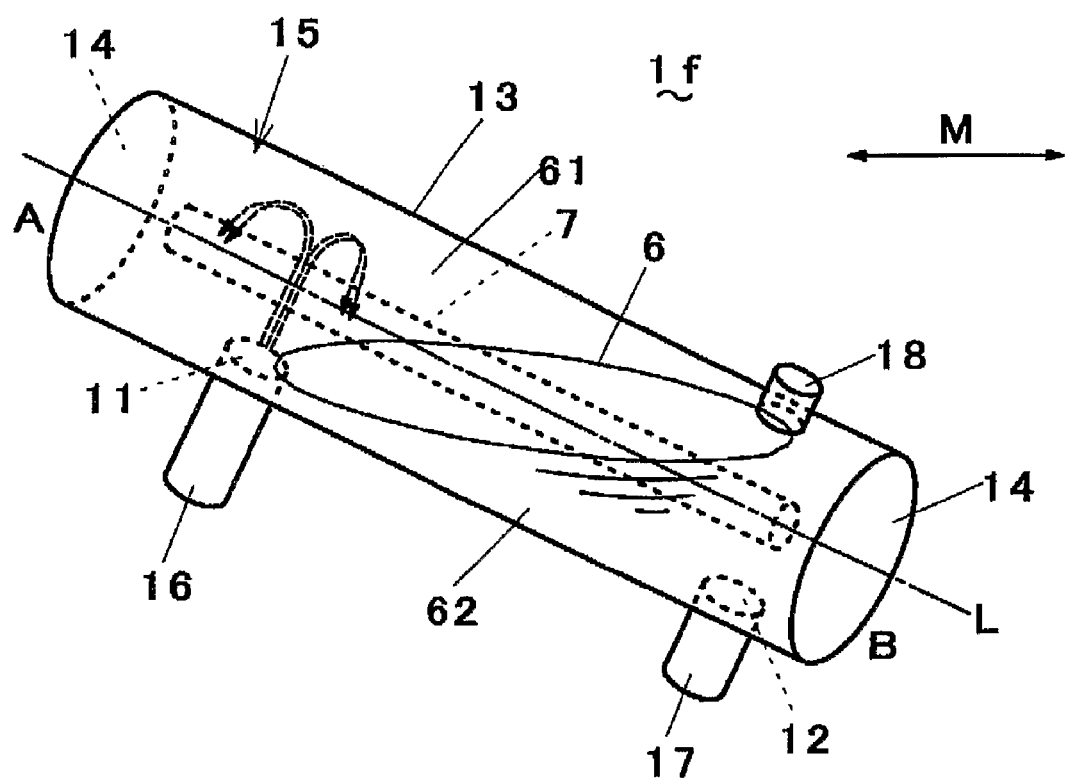

F I G .13
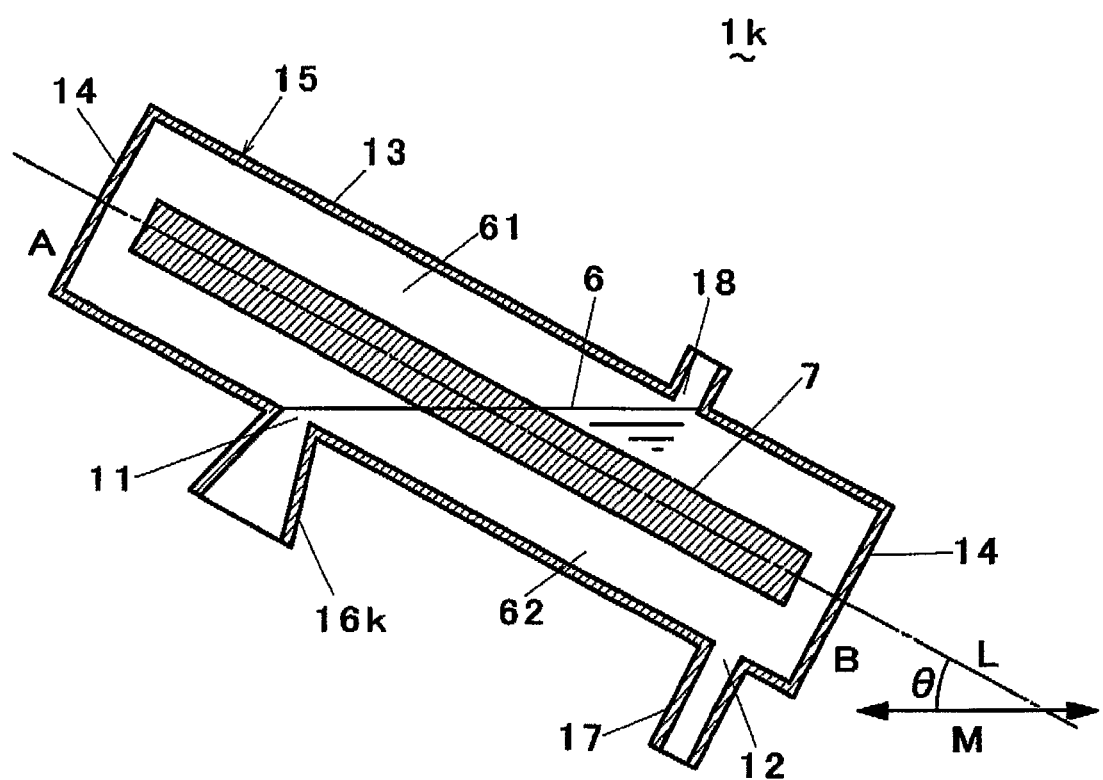

GAS DISSOLVING APPARATUS

TECHNICAL FIELD

The present invention relates to a gas dissolving apparatus which is to be used e.g. to generate fine gas bubbles in a bathtub, supply oxygen to an aquaculture preserve, purify pond or marsh water (float sludge), or the like.

BACKGROUND ART

A gas dissolving apparatus is known which has a gas dissolving tank, and injects a mixed fluid of a gas and a liquid into the tank so as to stir and thereby disperse and dissolve the gas in the liquid (refer to e.g. Japanese Laid-open Patent Publication 2004-290803). The gas dissolving tank of such a conventional gas dissolving apparatus is large and occupies a large installation space. Thus, there has been proposed a small gas dissolving apparatus which does not require a large tank, thereby achieving space reduction. This gas dissolving apparatus uses a tubular container containing or storing a gas and a liquid, and a mixed fluid of the gas and the liquid is further injected into the tubular container and stirred so as to disperse and dissolve the gas in the liquid. The thus stirred fluid is discharged from an outlet provided on the bottom of the tubular container.

However, the gas dissolving apparatus with such a tubular container has problems. For example, if the tubular container is placed with the length direction thereof being parallel to the horizon, it is true that the gas and the liquid form a long interface therebetween which extends over the entire length of the tubular container, and which thus has a large area to promote the dissolution of the gas into the liquid. However, the depth of the liquid contained or stored in the tubular container is shallow, such as about the radius of the cross-section of the tubular container cut by a plane perpendicular to the length of the tubular container, so that the gas-liquid mixed fluid is likely to be discharged from the tubular container before the gas is well dispersed and dissolved in the liquid, or while the gas in the liquid is present in the form of many large gas bubbles. On the other hand, if the tubular container is placed with the length direction thereof being perpendicular to the horizon, the gas and the liquid form a small-area interface with, at maximum, about an area of the cross-section of the tubular container cut by a plane perpendicular to the length of the tubular container, resulting in less dissolution of the gas into the liquid, although the depth of the liquid contained in the tubular container is deep enough to prevent the gas-liquid mixed fluid from being discharged while the gas in the liquid is present in the form of large gas bubbles.

DISCLOSURE OF INVENTION

An object of the present invention is to provide a gas dissolving apparatus which promotes the dissolution of a gas into a liquid without causing a mixed fluid of the gas and the liquid to be discharged from a tubular container while the gas in the liquid is present in the form of large gas bubbles.

According to a first aspect of the present invention, the above object is achieved by a gas dissolving apparatus comprising: a cylindrical tubular container having a side wall and closed at both ends thereof for containing a gas and a liquid; an injection inlet for injecting, into the tubular container, a gas-liquid mixed fluid of a liquid having a gas mixed therewith; and a liquid outlet for discharging the liquid in the tubular container outside. The tubular container is placed in an inclined posture such that a center axis of the tubular container is inclined to the horizon. The gas and the liquid in the tubular container form an interface therebetween, the center of which is positioned at a substantially center in a lengthwise direction of the side wall of the tubular container, in which a portion of an inner space of the tubular container above the interface is referred to as a gas containing section, while a portion of the inner space on or below the interface is referred to as a liquid containing section. The injection inlet is provided at a level corresponding to, or lower than, the level of the interface. The liquid outlet is provided near a bottom of the liquid containing section. Further, the gas-liquid mixed fluid is injected into the tubular container to stir the gas and the liquid in the gas-liquid mixed fluid as well as the gas and the liquid in the tubular container so as to dissolve the gas into the liquid.

The gas dissolving apparatus according to the first aspect of the present invention allows the area of the interface between the liquid and the gas in the tubular container to be large enough to promote the dissolution of the gas into the liquid, and also allows the depth of the liquid contained in the liquid to be deep enough to prevent the liquid from being discharged through the liquid outlet with large gas bubbles being present therein.

Preferably, the injection inlet is provided at a bottom of the tubular container as seen in a cross section perpendicular to the center axis of the tubular container. This allows the gas-liquid mixed fluid to collide with the side wall and the interface so as to be stirred, and also allows the injected fluid, as an injection flow, to stir the liquid contained in the liquid containing section, whereby the dissolution of the gas into the liquid is promoted.

Further preferably, the dissolving apparatus has an inlet pipe which sends the gas-liquid mixed fluid into the tubular container, and which is connected to the injection inlet and inclined so as to be directed closer toward one end of the tubular container present in the gas containing section. This allows the gas-liquid mixed fluid to collide a wide area of the inner surface of the gas containing section, thereby promoting the dissolution of the gas into the liquid.

Further preferably, the injection inlet is provided at a position offset from a bottom of the tubular container as seen in a cross section perpendicular to the center axis of the tubular container. This allows the gas-liquid mixed fluid injected through the injection inlet to form a swirl flow which moves along the inner surface of the side wall, starting from one side toward the top, and which strongly collides with the interface, whereby both the fluid itself and the liquid in the liquid containing section are strongly stirred to promote the dissolution of the gas into the liquid.

Further preferably, the gas dissolving apparatus further comprises a rod member which is placed along or near the center axis of the tubular container, and which extends from at least a position corresponding to the injection inlet to at least a position corresponding to the liquid outlet. This placement of the rod member along or near the center axis of the tubular container, where large bubbles are likely to be formed, reduces or eliminates space for large gas bubbles to be formed in. Thus, gas bubbles in the fluid become unlikely to be combined with each other to form large or larger gas bubbles, making it possible to prevent the reduction in contact area between the gas and the liquid, thereby preventing the reduction in speed of the dissolution of the gas into the liquid, and also preventing the liquid from being discharged through the liquid outlet with large gas bubbles being present therein.

Further preferably, the rod member is inclined relative to the center axis of the tubular container. This allows the stirring of the gas-liquid mixed fluid also in a swirl flow near or around the center axis of the tubular container, thereby preventing the formation of large gas bubbles near or around the center axis.

Further preferably, the rod member is formed of a hollow rod member having a gas inlet connected to the hollow thereof at a position in the liquid containing section as well as a gas outlet connected to the hollow thereof at a position in the gas containing section. This makes it possible for large gas bubbles remaining undissolved in the liquid to be sent back to the gas containing section through the hollow rod member, thereby preventing the liquid from being discharged through the liquid outlet with large gas bubbles being present therein.

Yet further preferably, the dissolving apparatus has an inlet pipe connected to the injection inlet for sending the gas-liquid mixed fluid into the tubular container, in which the inlet pipe has a tapered nozzle shape with a diameter decreasing toward the injection inlet. This makes it possible to increase the flow velocity of the gas-liquid mixed fluid injected through the injection inlet so as to increase the efficiency of the stirring of the gas and the liquid, thereby promoting the dissolution of the gas into the liquid.

According to a second aspect of the present invention, the above-described object is achieved by a gas dissolving apparatus comprising: a cylindrical tubular container having a side wall and closed at both ends thereof for containing a gas and a liquid; an injection inlet for injecting, into the tubular container, a gas-liquid mixed fluid of a liquid having a gas mixed therewith; and a liquid outlet for discharging the liquid in the tubular container outside. The tubular container is placed in an inclined posture such that a center axis of the tubular container is inclined to the horizon. The gas and the liquid in the tubular container form an interface therebetween, the center of which is positioned at a substantially center in a lengthwise direction of the side wall of the tubular container, in which a portion of an inner space of the tubular container above the interface is referred to as a gas containing section, while a portion of the inner space on or below the interface is referred to as a liquid containing section.

The injection inlet is provided at a top of the tubular container as seen in a cross-section perpendicular to the center axis of the tubular container. The liquid outlet is provided near a bottom of the liquid containing section. Further, the gas-liquid mixed fluid is injected into the tubular container to stir the gas and the liquid in the gas-liquid mixed fluid as well as the gas and the liquid in the tubular container so as to dissolve the gas into the liquid. This allows the gas-liquid mixed fluid injected through the injection inlet strongly collides with the interface positioned below the injection inlet, whereby both the fluid itself and the liquid in the liquid containing section are strongly stirred so as to promote the dissolution of the gas into the liquid.

BRIEF DESCRIPTION OF DRAWINGS

FIG. 3A is a schematic side cross-sectional view of the gas dissolving apparatus along a plane through a center axis of FIG. 1, while

FIG. 5A is a schematic side cross-sectional view of a gas dissolving apparatus according to a second modified example of the first embodiment, while

FIG. 6A is a schematic side cross-sectional view of a gas dissolving apparatus according to a third modified example of the first embodiment, while

FIG. 8 is a schematic transparent perspective view of a gas dissolving apparatus according to a second embodiment of the present invention;

FIG. 9A is a schematic side cross-sectional view of the gas dissolving apparatus along a plane passing through a center axis L of FIG. 8, while

FIG. 11A is a schematic side cross-sectional view of a gas dissolving apparatus according to a second modified example of the second embodiment, while

FIG. 13 is a schematic side cross-sectional view of a gas dissolving apparatus according to a fourth modified example of the second embodiment.

BEST MODE FOR CARRYING OUT THE INVENTION

Figure 1:
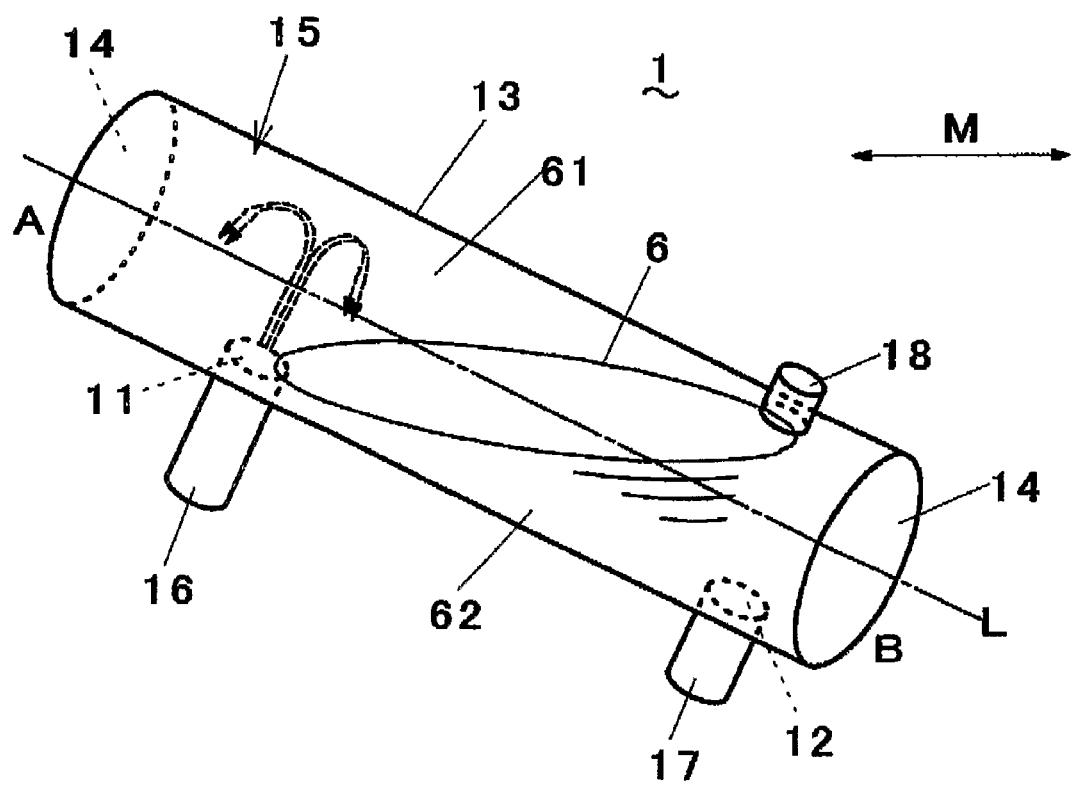
FIG. 1 is a schematic transparent perspective view of a gas dissolving apparatus according to a first embodiment of the present invention.

Embodiments of the present invention, as best mode for carrying out the invention, will be described hereinafter with reference to the drawings. It is to be understood that the embodiments herein are not intended as limiting, or encompassing the entire scope of, the invention. Note that like parts are designated by like reference numerals or characters throughout the drawings.

First Embodiment

Figure 2:
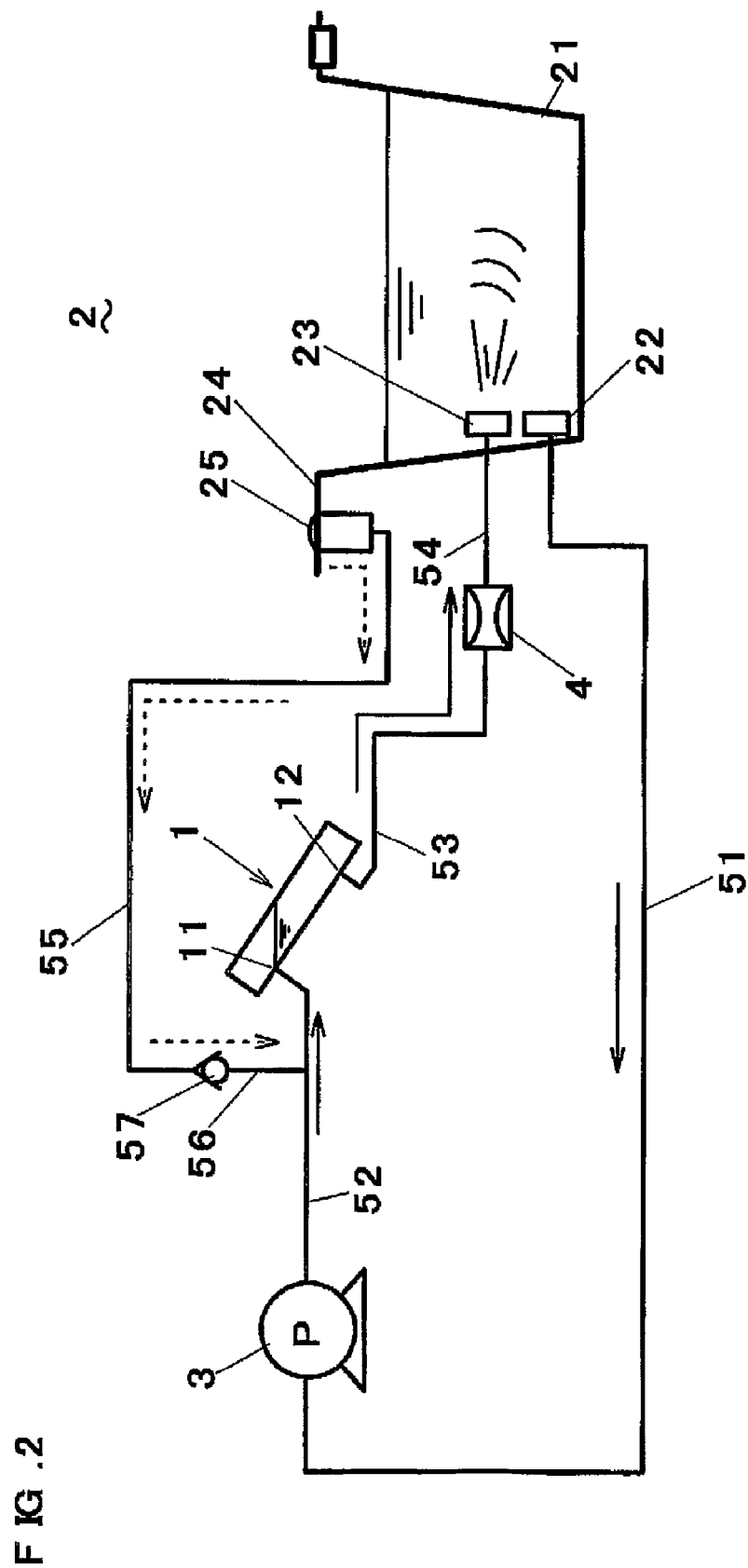
FIG. 2 is a schematic view showing a bathtub system using the gas dissolving apparatus.
Figure 3A:
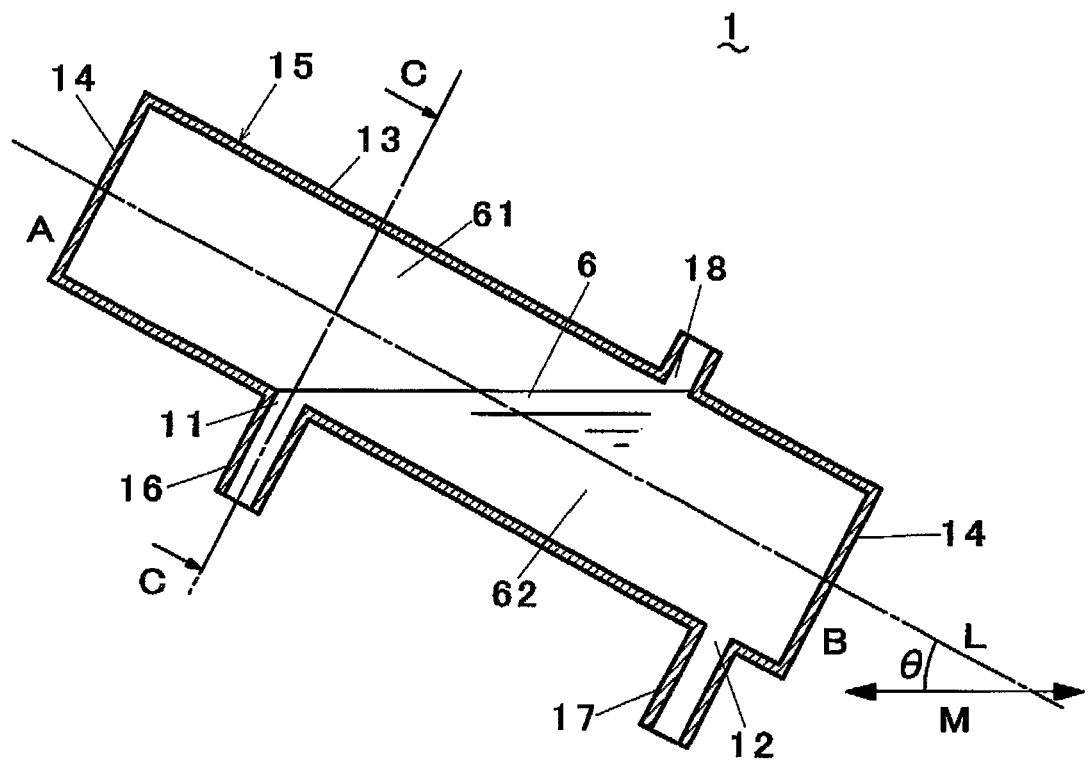
Figure 3B:
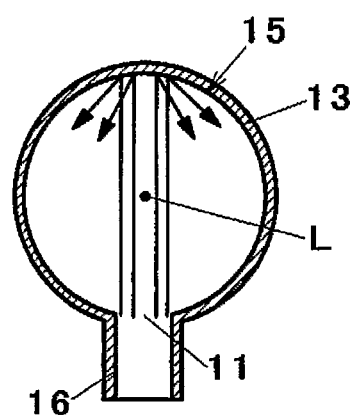
FIG. 3B is a schematic cross-sectional view of the gas dissolving apparatus along line C-C of FIG. 3A.

Referring to FIG. 1, FIG. 2, FIG. 3A and FIG. 3B, a gas dissolving apparatus 1 as a basic example according to a first embodiment of the present invention will be described. FIG. 1 is a schematic transparent perspective view of the gas dissolving apparatus (hereafter referred to simply as "dissolving apparatus") 1, while FIG. 3A is a schematic side cross-sectional view of the dissolving apparatus 1 along a plane passing through a center axis L of FIG. 1, and FIG. 3B is a schematic cross-sectional view of the dissolving apparatus 1 along line C-C of FIG. 3A which is perpendicular to the center axis L. On the other hand, FIG. 2 is a schematic view showing a bathtub system 2 using the dissolving apparatus 1. The dissolving apparatus 1 allows a mixed fluid (hereafter referred to simply as "fluid") of a gas and a liquid to be introduced therein, disperses and dissolves the gas in the liquid, and discharges, to outside, the liquid having the gas dissolved therein.

The dissolving apparatus 1 comprises a cylindrical tubular container 15 which comprises: a cylindrical side wall 13 having a cross section of a substantially circular shape; and end walls 14 for closing both ends A, B in the length direction (center axis L direction) of the side wall 13. The tubular container 15 is placed in an inclined posture such that the center axis L of the tubular container 15 or side wall 15 is inclined to, or forms an angle θ of 10 to 40° with, the horizon M. This angular range is preferable in order to achieve a desired effect, i.e. to promote the dissolution of the gas into the liquid without causing the liquid to be discharged from the tubular container 15 while the gas in the liquid is present in the form of large gas bubbles remaining undissolved in the liquid. Note that angles outside the angular range can also be used for the inclined posture as long as the inclined posture contributes to the desired effect.

The tubular container 15 contains or stores therein a gas such as air as a solute, and a liquid such as water as a solvent. Any other appropriate combination of gas and liquid can also be used as the combination of solute and solvent. The gas and the liquid form an interface 6 therebetween, in which a center of the interface 6 is positioned at a substantially center in a lengthwise direction of the side wall 13 of the tubular container 15. The portion of an inner space of the tubular container 15 above the interface 6 is referred to as a gas containing section 61, while the portion of the inner space on or below the interface 6 is referred to as a liquid containing section 62. A gas outlet 18 is provided in a portion of an upper inner surface of the side wall 13 near and above the interface 6.

Furthermore, the tubular container 15 has an injection inlet 11 in the side wall 13 for injecting a fluid therein. The injection inlet 11 is provided at a bottom of the side wall 13 or tubular container 15 as seen in the cross-sectional view of FIG. 3B, and at a level corresponding to, or lower than, the level of the interface 6. In view of the efficiency of stirring the gas and the liquid, it is preferable that the injection inlet 11 is provided at a level slightly lower than the level of the interface 6. An inlet pipe 16 is connected to the injection inlet 11 and extends substantially perpendicular to the side wall 13 or perpendicular to the center axis L of the tubular container 15. The tubular container 15 further has a liquid outlet 12 in the side wall 13 which is provided near a bottom of the liquid containing section 62 for discharging the liquid in the tubular container 15, while an outlet pipe 17 is connected to the liquid outlet 12.

Referring now to FIG. 2, the bathtub system 2 will be described. The bathtub system 2 having the dissolving apparatus 1 incorporated therein comprises: a bathtub 21; a pump 3 for sucking the liquid in the bathtub 21 and sending the sucked liquid to the dissolving apparatus 1; and a venturi 4 placed between the dissolving apparatus 1 and the bathtub 21 for releasing or reducing the pressure of the liquid sent from the gas dissolving apparatus 1. A centrifugal pump, for example, is used as the pump 3. The suction side of the pump 3 is connected to an outlet 22 of the bathtub 21 via a pipe 51, while the discharge side of the pump 3 is connected to the injection inlet 11 of the dissolving apparatus 1 via a pipe 52. On the other hand, the liquid outlet 12 of the dissolving apparatus 1 is connected to an inlet of the venturi 4 via a pipe 53, while an outlet of the venturi 4 is connected to an inlet 23 of the bathtub 21 via a pipe 54. The bathtub 21 has a flange portion 24 with an air suction inlet 25. The air suction inlet 25 is connected to a mid point of the pipe 52 via a pipe 55 and a pipe 56. A check valve 57 is provided at the connection between the pile 55 and the pipe 56 to prevent the liquid from flowing from the pipe 52 to the air suction inlet 25.

In the bathtub system 2, the pump 3 sucks the liquid in the bathtub 21 from the outlet 22 of the bathtub 21, and sends the sucked liquid to the dissolving apparatus 1 via the pipe 52. At this time, the air is simultaneously sucked into the pipe 52 via the air suction inlet 25. Accordingly, the fluid of liquid and gas is injected from the pipe 52 into the dissolving apparatus 1 so as to disperse and dissolve the gas into the liquid. The liquid having the gas dissolved therein is sent via the pipe 52 to the venturi 4 which reduces the pressure (inner pressure) of the liquid, so that when the liquid is injected into the liquid in the bathtub 21 via the inlet 23, the gas precipitates in the liquid whereby fine gas bubbles of the gas are produced in the liquid.

Next, the operation of the dissolving apparatus 1 will be described. Within the tubular container 15, the liquid and the gas are contained or present in the liquid containing section 62 and the gas containing section 61, respectively, while the fluid is injected into the tubular container 15 through the injection inlet 11. As described above, the injection inlet 11 is provided in the side wall 13 at a position corresponding to, or slightly lower than, the level of the interface 6. Thus, the fluid from the injection inlet 11, as an injection flow, is injected strongly into the tubular container 15 without being reduced in speed, and collides with, and splashes back from, an upper inner surface of the side wall 13, forming a swirl flow. The fluid then collides with the interface 6 and merges with the liquid in the liquid containing section 62.

During the time from when the fluid collides with the upper inner surface of the side wall 13 to when the fluid merges with liquid in the liquid containing section 62, the fluid temporarily floats in the gas containing section 61 in the form of fluid drops, thereby increasing the surface area of the fluid, so that the dissolution of the gas into the liquid of the fluid is promoted or accelerated during the temporary floating. Since the center of the interface 6 is positioned at a substantially center in the lengthwise direction of the side wall 13 of the tubular container 13, the gas containing section 61 is large enough for the promotion of the dissolution of the gas. In this process from the injection of the fluid through the injection inlet 11 to the merging with the liquid, the fluid is strongly stirred so as to dissolve the gas into the liquid of the fluid. On the other hand, the liquid in the liquid containing section 62 is also strongly stirred not only by the collision of the fluid with the liquid, but also by the injection of the fluid into the tubular container 15 through the injection inlet 11.

In this way, in both the fluid and the liquid contained or present in the tubular container 15, the gas is dispersed and dissolved in the liquid, and the dissolution is promoted due to the stirring of the fluid itself as well as the stirring of the liquid in the tubular container 15 by the injection of the fluid into the tubular container 15 through the injection inlet 11 and by the collision of the fluid with the liquid. More specifically, the dissolution of the gas into the liquid is promoted by increasing the entire surface area of the gas bubbles to contact the liquid and by suppressing an increase in the dissolution concentration of the gas near the interface 6 between the liquid and the gas.

Here, the increase in the entire surface area of the gas bubbles is achieved by the stirring of the fluid and the liquid, because the stirring of the fluid and the liquid generates a shear force on each gas bubble in the fluid and the liquid so as to segment the gas bubbles (air) therein. The suppression of an increase in the dissolution concentration of the gas in the liquid near the interface 6 is achieved by the stirring of the liquid, because the stirring of the liquid homogenizes the dissolution concentration of the gas in the liquid, so that the increase in the dissolution concentration of the gas in the liquid at the interface 6 or an upper portion of the liquid near the interface 6, which is caused as the gas is dissolved into the liquid from the interface 6, is suppressed by the homogenization, while the dissolution concentration of the gas at a lower portion of the liquid is increased by the homogenization.

The gas-dissolved liquid obtained by thus promoting the dissolution of the gas into the liquid is contained or stored in the liquid containing section 62 of the tubular container 15. The liquid in the liquid containing section 62 may still contain many undissolved gas bubbles. However, such gas bubbles hardly exist at a bottom or lower portion of the liquid containing section 62, although relatively more gas bubbles may exist at an upper portion of the liquid containing section 62. Thus, the dissolving apparatus 1 allows the gas-dissolved liquid at a bottom of the liquid containing section 62, with almost no large gas bubbles, to be discharged from the liquid outlet 12 and the outlet pipe 17 outside the tubular container 15 (to the pipe 53).

According to the present embodiment, the tubular container 15 of the dissolving apparatus 1 is placed in an inclined posture such that the center axis L is inclined relative to the horizon M. This inclination of the tubular container 15 makes it possible to increase an area of the interface 6 between the gas and the liquid in the tubular container 15 so as to increase the efficiency of mixing and stirring the gas and the liquid for the purpose of promoting the dissolution of the gas into the liquid, while maintaining a sufficient depth of the liquid in the liquid containing section 62 of the tubular container 15 so as to prevent gas bubbles from being discharged outside the tubular container 15.

In contrast, if the tubular container (15) were placed with the length direction being parallel to the horizon (M), the depth of the liquid in the liquid containing section (62) would be shallow, such as about the radius of the cross-section of the tubular container (15). Accordingly, the gas-liquid mixed fluid would be likely to be discharged from the tubular container (15) before sufficient dispersion and dissolution of the gas in the liquid, or with the gas in the liquid being present in the form of many large gas bubbles remaining undissolved in the liquid, although the gas and the liquid would form a long interface (6) extending over the entire length of the tubular container (15), and thus having a large area of the interface (6) to promote the dissolution of the gas into the liquid.

On the other hand, if the tubular container (15) were placed with the length direction being perpendicular to the horizon (M), the gas and the liquid would form a small-area interface (6) with, at maximum, about an area of the cross-section of the tubular container (15), resulting in lower efficiency of mixing and stirring and less dissolution of the gas into the liquid, although the depth of the liquid in the liquid containing section (62) would be deep enough to prevent the gas-liquid mixed fluid from being discharged with the gas in the liquid being present in the form of large gas bubbles. In contrast, as described above, the inclined posture of the tubular container 15 according to the first embodiment of the present invention allows the interface 6 to be sufficiently large and the liquid in the liquid containing section 62 to be sufficiently deep, thereby increasing the efficiency of mixing and stirring the fluid, and preventing large gas bubbles from being discharged. Furthermore, the dissolving apparatus 1 is simple in structure, enabling low manufacturing cost, and small in size, enabling installation space reduction.

Figure 4:
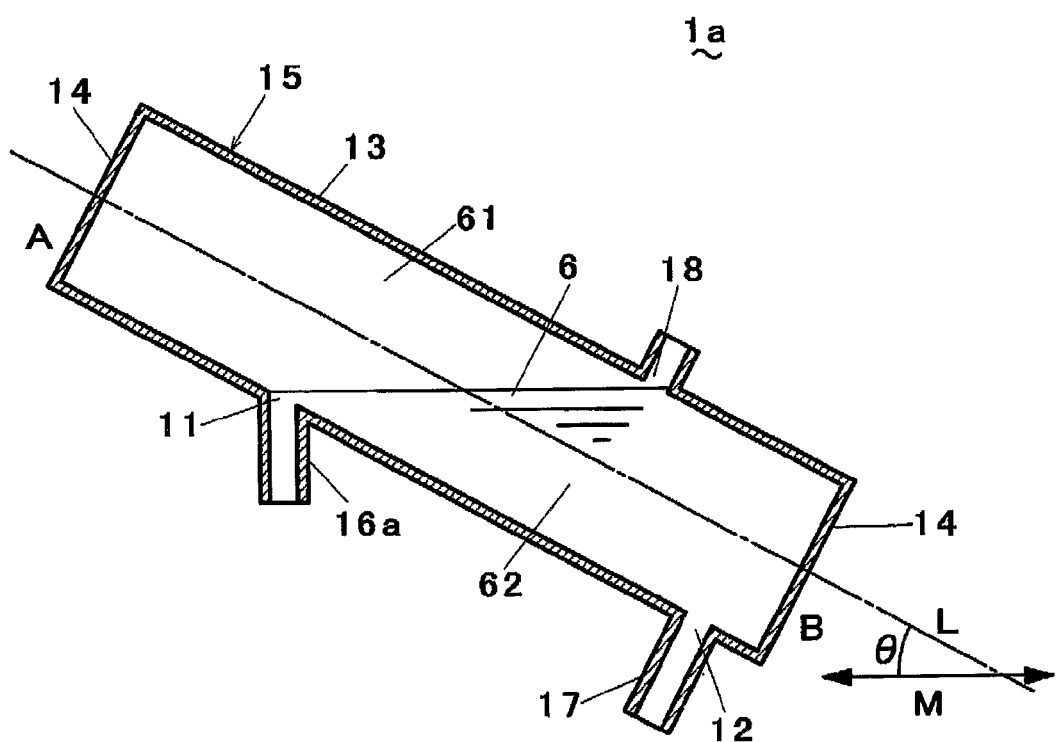
FIG. 4 is a schematic side cross-sectional view of a gas dissolving apparatus according to a first modified example of the first embodiment.
Figure 5A:
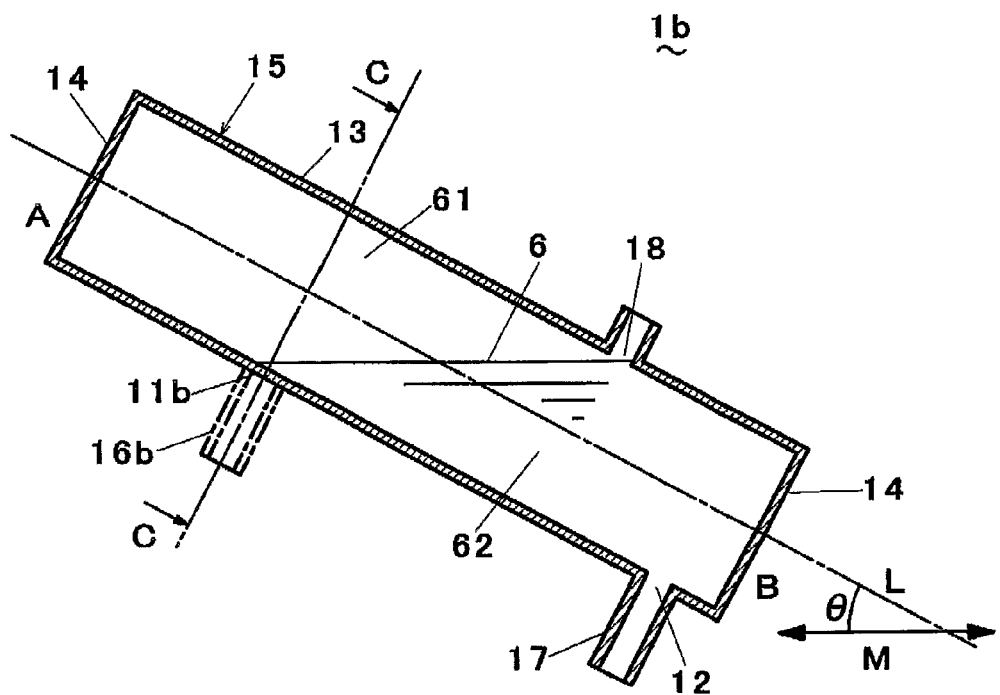
Figure 5B:
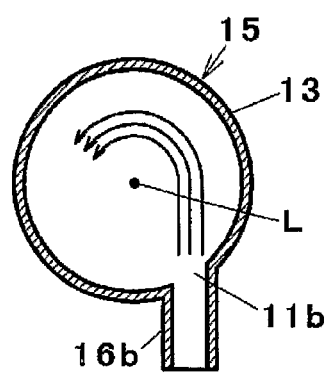
FIG. 5B is a schematic cross-sectional view of the gas dissolving apparatus along line C-C of FIG. 5A.
Figure 5C:
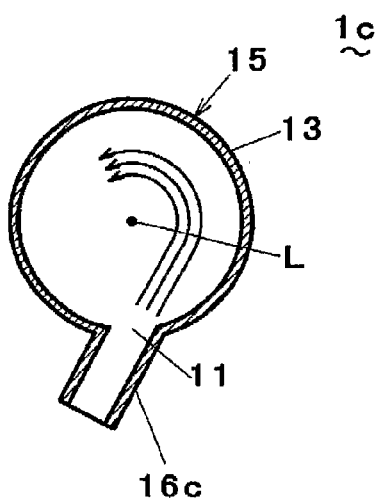
FIG. 5C is a schematic cross-sectional view of a further modified example of the second modified example.
Figure 6A:
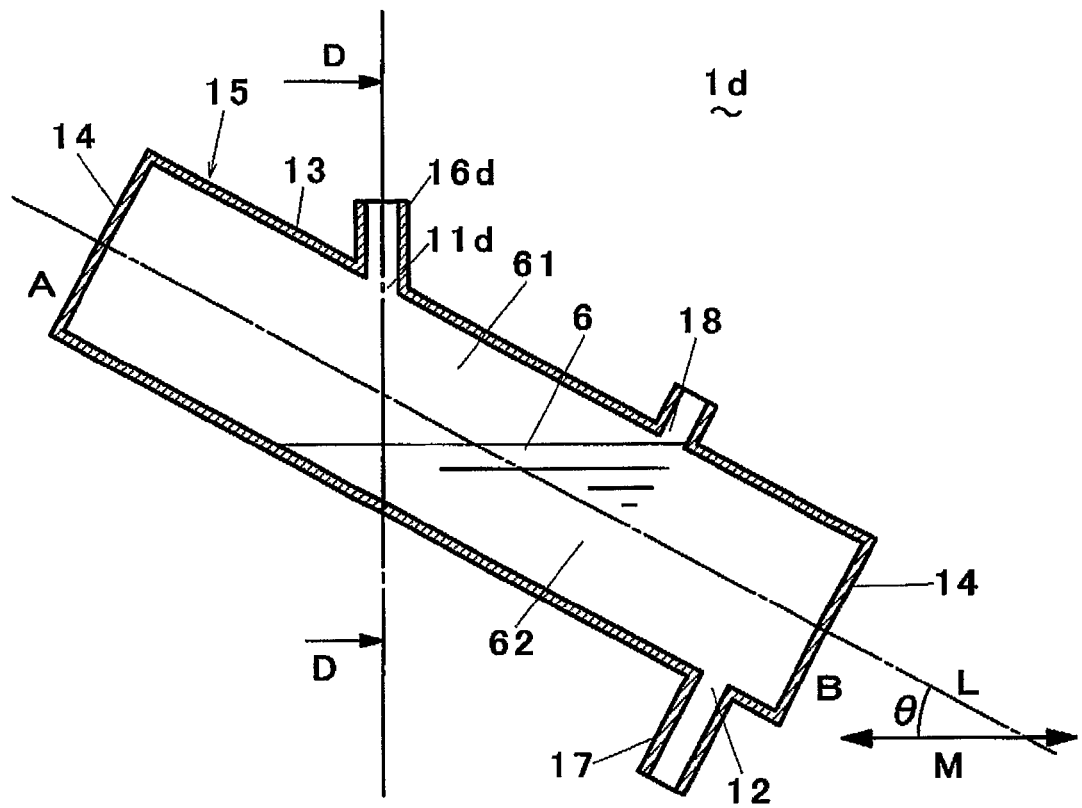
Figure 6B:
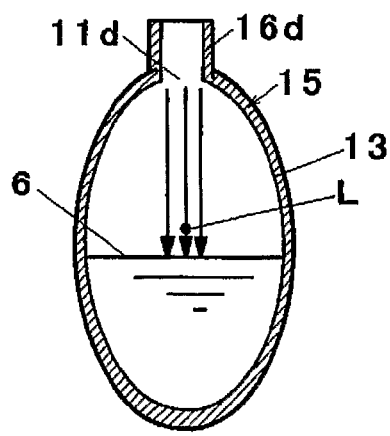
FIG. 6B is a schematic cross-sectional view of the gas dissolving apparatus along line D-D of FIG. 6A.
Figure 7:
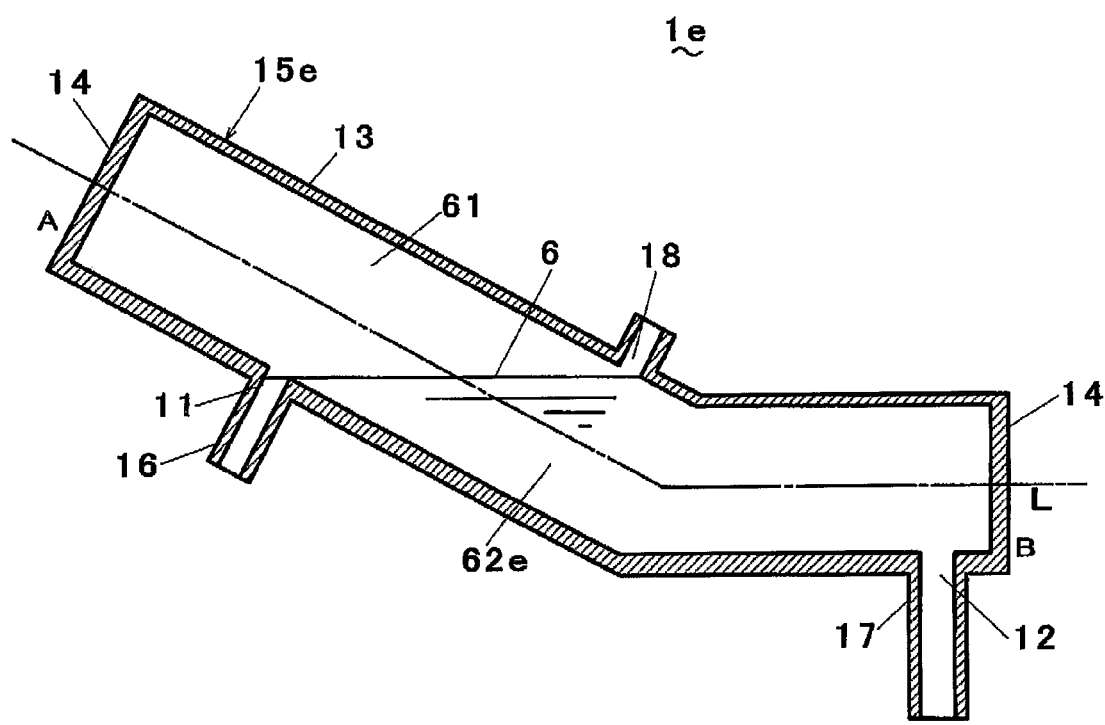
FIG. 7 is a schematic side cross-sectional view of a gas dissolving apparatus according to a fourth modified example of the first embodiment.

Hereinafter, modified examples of the dissolving apparatus 1 according to the first embodiment will be described with reference to FIGS. 4 to 7, in which FIG. 4 shows a first modified example, FIGS. 5A and 5B show a second modified example, FIG. 5C shows an example further modified from the second modified example, and FIGS. 6A and 6B show a third modified example, while FIG. 7 shows a fourth modified example. In the following description, features of the modified examples which are different from the basic example will be mainly described. First, FIG. 4 is a schematic side cross-sectional view, corresponding to that of FIG. 3A, of a dissolving apparatus 1a according to the first modified example.

Referring to FIG. 4, the dissolving apparatus 1a has an inlet pipe 16a which is connected to the injection inlet 11 and inclined from the direction perpendicular to the side wall 13 of the tubular container 15 so as to be directed closer toward one end A of the tubular container 15 present in the gas containing section 61, whereby the injection of the fluid through the injection inlet 11 is directed relatively toward the one end A of the tubular container 15 rather than perpendicularly to the side wall 13, so that the fluid collides with an area of the upper inner surface of the side wall 13 which is located on an extension of (the axis of) the inlet pipe 16, and is thus closer to the end A than in the dissolving apparatus 1, as the basic example, of the first embodiment shown in FIG. 1 and FIGS. 3A, 3B.

A fluid is injected through the injection inlet 11 into the tubular container 15 of the dissolving apparatus 1a, and collides with, and splashes back from, the area of the upper surface of the side wall 13 located on the extension of the inlet pipe 16a. The fluid then collides with the interface 6, and merges with the liquid contained in the liquid containing section 62. During the time from when the fluid collides with the area of the upper inner surface of the side wall 13 to when the fluid merges with liquid in the liquid containing section 62, the fluid temporarily floats in the gas containing section 61 in the form of fluid drops similarly as in the dissolving apparatus 1 as the basic example. Here, the inlet pipe 16a in the dissolving apparatus 1a is inclined from the direction perpendicular to the side wall 13, so that the fluid collides with a larger area of the upper inner surface of the side wall 13 in the dissolving apparatus 1a than in the dissolving apparatus 1. This allows the fluid drops to float in the gas containing section 61 of the dissolving apparatus 1a wider and longer than in that of the dissolving apparatus 1, promoting the dissolution of the gas into the liquid of the fluid.

Referring now to FIG. 5A and FIG. 5B, a dissolving apparatus 1b according to the second modified example will be described. FIG. 5A is a schematic side cross-sectional view, corresponding to that of FIG. 3A, of the dissolving apparatus 1b, while FIG. 5B is a schematic cross-sectional view of the dissolving apparatus 1b along line C-C of FIG. 5A. As shown, the dissolving apparatus 1b has an injection inlet 11b provided on the side wall 13 at a position offset from the bottom of the side wall 13 or tubular container 15 as seen in the cross-sectional view of FIG. 5B which is perpendicular to the center axis L. An inlet pipe 16b is connected to the injection inlet 11b and extends substantially parallel to the direction in which the inlet pipe 16 shown in FIG. 3A and FIG. 3B extends.

When a fluid is injected into the tubular container 15 through the injection inlet 11b, the fluid is strongly injected toward, and collides with, an area of the upper inner surface on one side of the side wall 13 located on an extension of (the axis of) the inlet pipe 16b. The fluid moves at a high speed along the upper inner surface on the one side of the side wall 13 toward the top of the inner surface and then onward to form a swirl flow, which then strongly collides with the interface 6 of, and merges with, the liquid in the liquid containing section 62. When the fluid collides with the upper inner surface of the side wall 13, fluid drops are also formed. In this process in the dissolving apparatus 1b, similarly as in the basic example, both the fluid itself and the liquid in the liquid containing section 62 are stirred so as to promote the dissolution of the gas into the liquid.

Referring now to FIG. 5C, a dissolving apparatus 1c, which is further modified from the second modified example, will be described. FIG. 5C is a schematic cross-sectional view, corresponding to that of FIG. 3B and FIG. 5B, of the dissolving apparatus 1c. As shown, the dissolving apparatus 1c has an injection inlet 11 provided on a bottom of the side wall 13 or tubular container 15 as seen in the cross-sectional view of FIG. 5C similarly as in the injection inlet 11 of the basic example shown in FIG. 3A and FIG. 3B. An inlet pipe 16c is connected at an angle to the injection inlet 11. Similarly as in the second modified example, when a fluid is injected into the tubular container 15 through the injection inlet 11, the fluid is strongly injected toward, and collides with, an area of the upper inner surface of the side wall 13 which is located on an extension of (the axis of) the inlet pipe 16c. This forms a swirl flow, which then strongly collides with the interface 6 of, and merges with, the liquid contained in the liquid containing section 62. Consequently, in this process in the dissolving apparatus 1c, both the fluid itself and the liquid in the liquid containing section 62 are stirred so as to promote the dissolution of the gas into the liquid, similarly as in the basic example and the second modified example.

Referring now to FIG. 6A and FIG. 6B, a dissolving apparatus 1d according to the third modified example will be described. FIG. 6A is a schematic side cross-sectional view, corresponding to that of FIG. 3A, of the dissolving apparatus 1d, while FIG. 6B is a schematic cross-sectional view of the dissolving apparatus 1d along line D-D of FIG. 6A. The dissolving apparatus 1d has an injection inlet 11d provided at a top of the side wall 13 or tubular container 15 as seen in the cross-sectional view of FIG. 6B or as seen in a cross section perpendicular to the center axis L of the tubular container 15, and an inlet pipe 16d connected to the injection inlet 11d at an angle to the side wall 13. When a fluid is injected downward into the tubular container 15 from the inlet pipe 16d through the injection inlet 11d, the fluid strongly collides with the interface 6 of, and merges with, the liquid in the liquid containing section 62, whereby both the fluid itself and the liquid in the liquid containing section 62 are stirred so as to promote the dissolution of the gas into the liquid, similarly as in the basic example and the previous modified examples.

FIG. 7 is a schematic side cross-sectional view, corresponding to that of FIG. 3A, of a dissolving apparatus 1e according to the fourth modified example. As shown, the dissolving apparatus 1e has a bent tubular container 15e in contrast to the simple tubular container 15 in the previous examples (basic and the modified examples) described above. More specifically, the side wall 13 of the tubular container 15 has two cylindrical tubes connected at an angle to each other, so that the center axis L of the tubular container 15e is also bent, and that the tubular container 15e has a liquid containing section 62e which includes the connecting portion between the two cylindrical tubes. An advantage of this bent structure is that the distance from the interface 6 to the liquid outlet 12 is longer than that in the previous examples, so that the gas-liquid mixed fluid is less likely to be discharged from the liquid outlet 12 of the tubular container 15e while the gas in the liquid is present in the form of large gas bubbles than in the tubular container 15 of the previous examples. This bent tubular container structure can be applied to any of the previous examples as well.

Second Embodiment

Figure 9A:
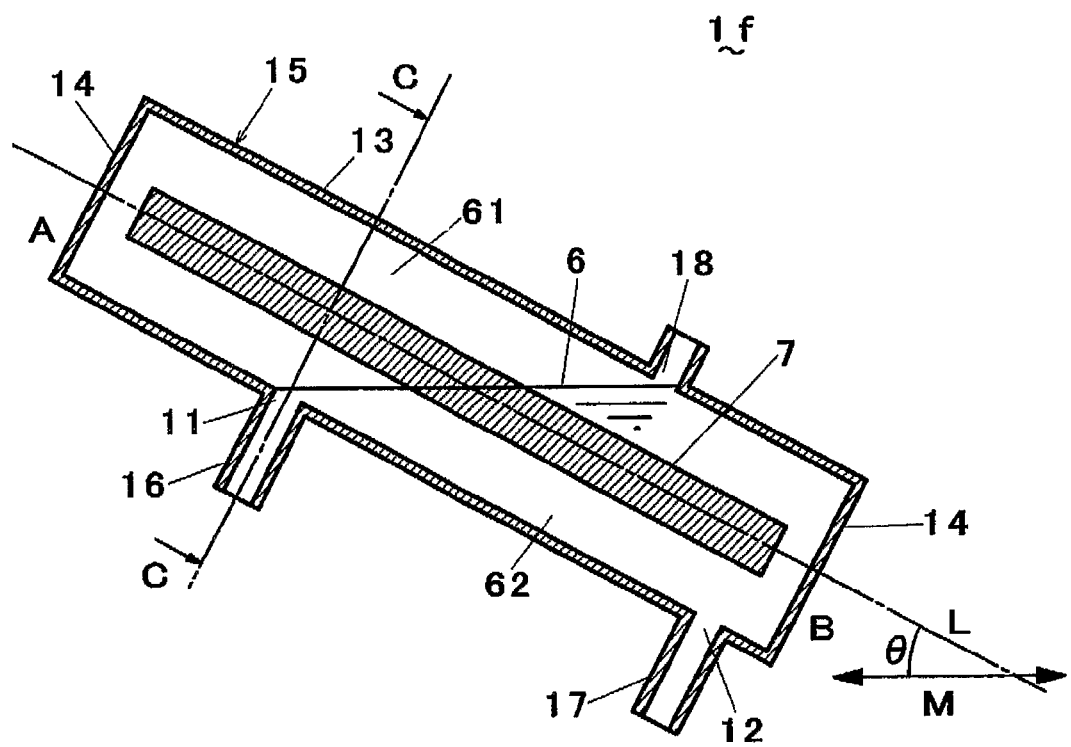
Figure 9B:
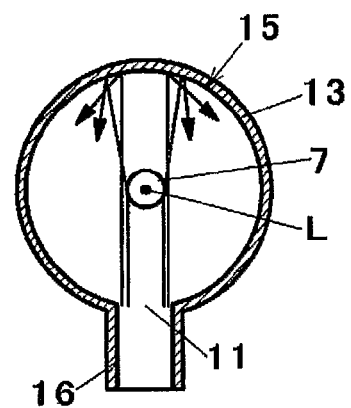
FIG. 9B is a schematic cross-sectional view of the gas dissolving apparatus along line C-C of FIG. 9A.

Referring to FIG. 8, FIG. 9A and FIG. 9B, a dissolving apparatus 1f as a basic example according to a second embodiment of the present invention will be described. FIG. 8 is a schematic transparent perspective view of the dissolving apparatus 1f, and FIG. 9A is a schematic side cross-sectional view of the dissolving apparatus 1f along a plane passing through a center axis L of FIG. 8, while FIG. 9B is a schematic cross-sectional view of the dissolving apparatus 1f along line C-C of FIG. 9A which is perpendicular to the center axis L. The gas dissolving apparatuses 1 and 1f of the first and second embodiments are similar to each other, except that the latter additionally has a rod member 7 which is placed along or near the center axis L of the tubular container 15, and which extends from at least a position corresponding to the injection inlet 11 to at least a position corresponding to the liquid outlet 12. Although not shown, the rod member 7 is fixed to the side wall 13 of the tubular container 15 by any appropriate means. The effect of the rod member 7 will be described below.

Gas bubbles in a fluid injected through the injection inlet 11 are likely to be combined with each other to form large or larger gas bubbles. This is more likely to occur near the center axis L of the tubular container 15. If large gas bubbles are formed, the contact area between the gas and the liquid is reduced, thereby reducing the speed or rate of the dissolution of the gas into the liquid. The placement of the rod member 7 along or near the center axis L, where large bubbles are likely to be formed, reduces space for large gas bubbles to be formed in. The reduction of the space for large gas bubbles to be formed in makes it possible to prevent the reduction in the speed of the dissolution of the gas into the liquid, and to prevent large gas bubbles from being discharged out of the liquid outlet 12.

Figure 10:
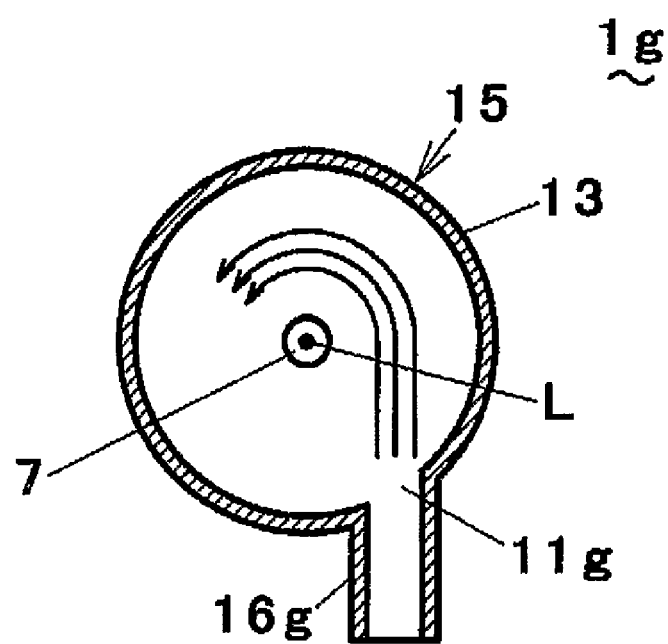
FIG. 10 is a schematic cross-sectional view of a gas dissolving apparatus according to a first modified example of the second embodiment.

FIG. 10 is a schematic cross-sectional view, corresponding to FIG. 5B, of a dissolving apparatus 1g according to a first modified example of the second embodiment. As shown, the dissolving apparatus 1g has an injection inlet 11g provided on the side wall 13 at a position offset from the bottom of the side wall 13. An inlet pipe 16g is connected to the injection inlet 11b and extends substantially parallel to the direction in which the inlet pipe 16 shown in FIG. 3A and FIG. 3B extends. When a fluid is injected into the tubular container 15 through the injection inlet 11b, the fluid forms a swirl flow similarly as in the modified example shown in FIG. 5B. Gas or gas bubbles are likely to gather along the center axis L by centrifugal force of the swirl flow. However, the presence of the rod member 7 reduces space for large gas bubbles to be formed in, preventing the formation of large gas bubbles. Further, the swirl flow of the fluid strongly collides with the interface (6) of the liquid in the liquid containing section (62), thereby promoting stirring of the fluid and dissolution of the gas into the liquid.

Figure 11A:
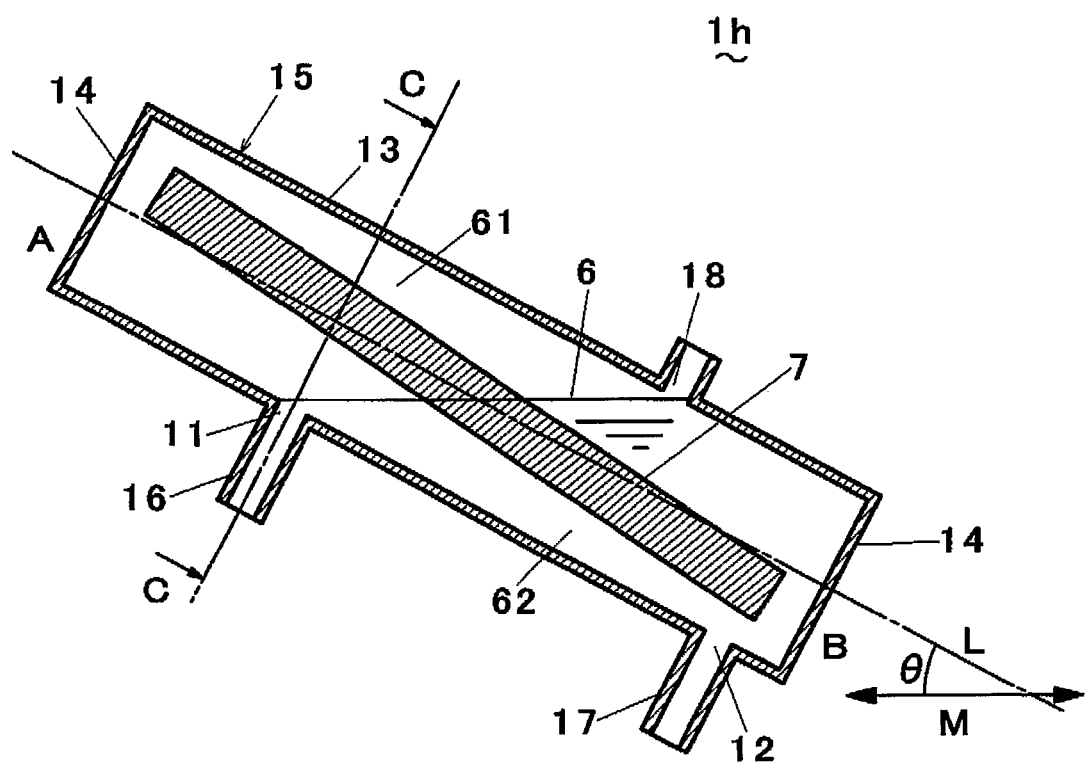
Figure 11B:
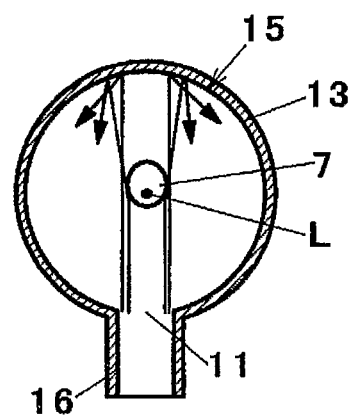
FIG. 11B is a schematic cross-sectional view of the gas dissolving apparatus along line C-C of FIG. 11A.

FIG. 11A is a schematic side cross-sectional view, corresponding to that of FIG. 9A, of a dissolving apparatus 1h according to a second modified example of the second embodiment, while FIG. 11B is a schematic cross-sectional view, corresponding to that of FIG. 9B, of the dissolving apparatus 1h along line C-C of FIG. 11A. As shown, the dissolving apparatus 1h is similar to the dissolving apparatus 1f of the basic example, except that the rod member 7, which is placed along or near the center axis L of the side wall 13 or tubular container 15, and which extends from at least a position corresponding to the injection inlet 11 to at least a position corresponding to the liquid outlet 12, is inclined relative to the center axis L of the side wall 13 or tubular container 15, such that respective ends of the rod member 7 on the end A side and end B side of the tubular container 15 are positioned above the center axis L and below the center axis L, respectively, of the tubular container 15. This inclined posture of the rod member 7 allows the rod member 7 to further stir the fluid in the swirl flow around the rod member 7, thereby preventing the formation of large gas bubbles around the rod member 7.

Figure 12:
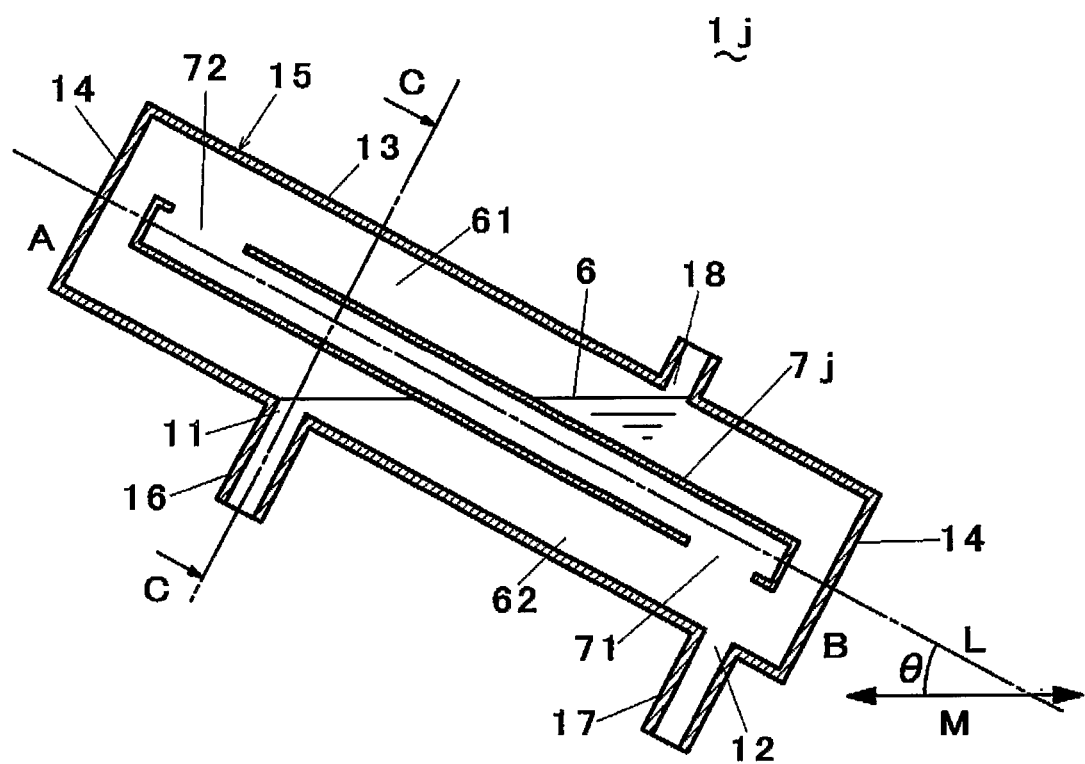
FIG. 12 is a schematic side cross-sectional view of a gas dissolving apparatus according to a third modified example of the second embodiment.

FIG. 12 is a schematic side cross-sectional view, corresponding to that of FIG. 9A, of a dissolving apparatus 1j according to a third modified example of the second embodiment. As shown, the dissolving apparatus 1j is similar to the dissolving apparatus 1f of the basic example, except that a hollow rod member 7j is used in place of the rod member 7. Although not shown, the hollow rod member 7j is fixed to the side wall 13 of the tubular container 15 by any appropriate means. The hollow rod member 7j has a gas inlet 71 facing downward and connected to the hollow thereof at a portion thereof close to the end B side of the tubular container 15 which is positioned in the liquid containing section 62.

The hollow rod member 7j also has a gas outlet 72 facing upward and connected to the hollow thereof at a portion thereof close to the end A side of the tubular container 15 which is positioned in the gas containing section 62. This hollow rod member 7j allows large gas bubbles formed in the liquid containing section 62 of the tubular container 15 to enter therein through the gas inlet 71, move therein upward, and exit through the gas outlet 72 so as to be sent back to the gas containing section 71. This hollow rod member 7j further prevents large gas bubbles remaining undissolved in the liquid from being discharged through the liquid outlet 12 of the tubular container 15. Note that although the hollow rod member 7j shown is a modification of that of FIG. 9A, it can also be used in an inclined posture similarly as in FIG. 11A.

FIG. 13 is a schematic side cross-sectional view, corresponding to that of FIG. 9A, of a dissolving apparatus 1k according to a fourth modified example of the second embodiment. As shown, the dissolving apparatus 1k is similar to the dissolving apparatus 1f of the basic example, except that the dissolving apparatus 1k has a tapered inlet pipe 16k having a tapered nozzle shape, which can be formed of a tapered movable nozzle, with the diameter decreasing toward the injection inlet 11 of the tubular container 15. This tapered inlet pipe 16k, especially if movable, facilitates changing the direction of fluid injection from the injection inlet 11, and/or increasing the flow velocity of the fluid therethrough, thereby making it possible to increase the efficiency of the stirring of the gas and the liquid.

It is to be noted that the present invention is not limited to the above embodiments, and various modifications are possible within the spirit and scope of the present invention. For example, although it is preferred that the injection inlet 11 (11b) be provided at a level slightly lower than the level of the interface 6 between the gas and the liquid in the liquid containing section 62 (62e) of the tubular container 15 (15e), the injection inlet 11 (11b) can be provided at a level significantly lower than the level of the interface 6. Furthermore, although the cylindrical tubular container 15 or cylindrical side wall 13 has a cross section of a substantially circular shape, it can be a polygonal shape such as a hexagon as long as the inner surface of the side wall 13 allows the fluid to efficiently collide therewith, form a swirl flow, and collide with the interface 6.

The present invention has been described using embodiments with reference to the annexed drawings. However, it may be apparent to those ordinarily skilled in the art that various alterations and modifications are possible. Accordingly, it should be interpreted that such alterations and modifications do not fall outside the scope of the present invention, but fall within the scope of the present invention.

This application is based on Japanese patent applications 2006-147396 and 2006-147397 filed May 26, 2006, the contents of which are hereby incorporated by reference.

The invention claimed is:

1. A gas dissolving apparatus comprising:
a cylindrical tubular container having a side wall and ends walls closing both ends thereof for containing a gas and a liquid;
an injection inlet for injecting, into the tubular container, a gas-liquid mixed fluid in which a gas is mixed with a liquid; and
a liquid outlet for discharging the liquid in the tubular container outside, wherein:
the tubular container is placed in an inclined posture such that a center axis of the tubular container is inclined at an angle of 10° to 40° to the horizon;
an interface is formed between the gas and the liquid in the tubular container, the center of which is positioned substantially center in a lengthwise direction of the side wall of the tubular container, a portion of an inner space of the tubular container above the interface being a gas containing section, and a portion of the inner space on or below the interface being a liquid containing section;
the injection inlet is provided at a level corresponding to, or lower than, the level of the interface;
the liquid outlet is provided near a bottom of the liquid containing section; and
the gas-liquid mixed fluid is injected into the tubular container to stir the gas and the liquid in the gas-liquid mixed fluid as well as the gas and the liquid in the tubular container so as to dissolve the gas into the liquid.

2. The gas dissolving apparatus according to claim 1, wherein the injection inlet is provided at a bottom of the tubular container as seen in a cross section perpendicular to the center axis of the tubular container.

3. The gas dissolving apparatus according to claim 2, wherein the dissolving apparatus has an inlet pipe which sends the gas-liquid mixed fluid into the tubular container, and which is connected to the injection inlet and inclined so as to be directed closer toward one end of the tubular container present in the gas containing section.

4. The gas dissolving apparatus according to claim 1, wherein the injection inlet is provided at a position offset from a bottom of the tubular container as seen in a cross section perpendicular to the center axis of the tubular container.

5. The gas dissolving apparatus according to claim 1, wherein the gas dissolving apparatus further comprises a rod member which is placed along or near the center axis of the tubular container, and which extends from at least a position corresponding to the injection inlet to at least a position corresponding to the liquid outlet.

6. The gas dissolving apparatus according to claim 5, wherein the rod member is inclined relative to the center axis of the tubular container.

7. The gas dissolving apparatus according to claim 5, wherein the rod member is formed of a hollow rod member having a gas inlet connected to the hollow thereof at a position in the liquid containing section as well as a gas outlet connected to the hollow thereof at a position in the gas containing section.

8. The gas dissolving apparatus according to claim 5, wherein the dissolving apparatus has an inlet pipe connected to the injection inlet for sending the gas-liquid mixed fluid into the tubular container, in which the inlet pipe has a tapered nozzle shape with a diameter decreasing toward the injection inlet.

9. The gas dissolving apparatus according to claim 6, wherein the rod member is formed of a hollow rod member having a gas inlet connected to the hollow thereof at a position in the liquid containing section as well as a gas outlet connected to the hollow thereof at a position in the gas containing section.

10. The gas dissolving apparatus according to claim 6, wherein the dissolving apparatus has an inlet pipe connected to the injection inlet for sending the gas-liquid mixed fluid into the tubular container, in which the inlet pipe has a tapered nozzle shape with a diameter decreasing toward the injection inlet.

11. A gas dissolving apparatus comprising:
- a cylindrical tubular container having a side wall and closed at end walls closing both ends thereof for containing a gas and a liquid;
- an injection inlet for injecting, into the tubular container, a gas-liquid mixed fluid in which a gas is mixed with a liquid; and
- a liquid outlet for discharging the liquid in the tubular container outside, wherein:
- the tubular container is placed in an inclined posture such that a center axis of the tubular container is inclined at an angle of 10° to 40° to the horizon;
- an interface is formed between the gas and the liquid in the tubular container, the center of which is positioned substantially center in a lengthwise direction of the side wall of the tubular container, a portion of an inner space of the tubular container above the interface being a gas containing section, and a portion of the inner space on or below the interface being a liquid containing section;
- the injection inlet is provided at a top of the tubular container as seen in a cross-section perpendicular to the center axis of the tubular container;
- the liquid outlet is provided near a bottom of the liquid containing section; and
- the gas-liquid mixed fluid is injected into the tubular container to stir the gas and the liquid in the gas-liquid mixed fluid as well as the gas and the liquid in the tubular container so as to dissolve the gas into the liquid.

* * * * *